United States Patent Office 3,361,276
Patented Jan. 2, 1968

3,361,276
METHOD OF LOADING A FIXED BED REACTOR WITH MULTIPLE SIZE CATALYST PARTICLES
Vladimir Haensel, Hinsdale, Ill., assignor to Universal Oil Products Company, Des Plaines, Ill., a corporation of Delaware
No Drawing. Filed July 1, 1965, Ser. No. 468,926
20 Claims. (Cl. 214—152)

This invention relates to a method for loading a fixed bed reactor with catalyst particles of different size. More particularly, this invention is directed to a technique for loading large commercially scaled reactors, as distinguished from laboratory sized reactors, with catalyst particles having at least two different sizes in such a way that the smaller particles are substantially uniformly distributed throughout the volume of the bed, preferably being positioned in the void spaces among the larger catalyst particles.

In the contacting of a mixed phase reactant stream with a fixed bed of catalyst, it is known that the contacting efficiency is improved if the bed is so arranged as to comprise a number of smaller particles uniformly disposed throughout the remaining body of larger particles. A typical application of this principle is the catalytic hydrocracking of heavy oil wherein a partly vaporized oil fraction in admixture with hydrogen is passed over a suitable catalyst. By introducing smaller catalyst particles into the void spaces between the larger particles, a more uniform flow of the vapor-gas-liquid mixture through the bed is obtained, channeling is reduced, and the contacting efficiency is increased. This in turn permits the achievement of a higher space velocity, or a higher conversion level, or both.

Practical implementation of a multiple size particle bed has so far been limited to small size reactors of the type customarily employed in bench scale, semi-works and pilot plant units. Such limited usefulness arises from the fact that it has proven virtually impossible, by conventional methods, to provide uniform distribution of the small particles within large volume beds. In small reactors, for example, the loading is accomplished by pouring the larger catalyst particles into the reactor, locking them in place, and then introducing the smaller sized particles into the reactor while simultaneously subjecting the reactor to mechanical vibration; such vibration provides the initial maximum density loading and subsequent proper distribution of the smaller particles. In larger installations, however, it is not feasible to provide for vibrating the reactor, and attempts to achieve the proper mixing of the catalyst particles in two or more size ranges have not been successful.

The present invention provides a method whereby particles of two or more different sizes may be properly distributed throughout a large volume bed. Beginning with one portion of larger particles of substantially uniform size and a second portion of smaller particles and prior to loading the particles into the reactor, the smaller particles are coated or encapsulated with a suitable removable solid encapsulating medium of sufficient thickness so as to have approximately the same exterior dimension as the larger particles. The encapsulated particles are then thoroughly mixed with the larger particles in the desired proportion. Such mixing is performed on a number of small batches of particles, each batch having a volume of 5–500 cubic feet, for example, with respect to which it is easy to achieve the requisite uniform distribution per batch using conventional mixing equipment. The premixed particles may be transported to the reactor site in suitable containers, such as 55 gallon drums, which are poured into the reactor in the usual manner. Since all particles are now of the same size, the particle distribution of the aggregate bed within the reactor is uniform.

The removable solid encapsulating medium is herein characterized as one which is removable by contact with a fluid capable of selectively removing the encapsulating medium without significantly affecting, either in a chemical or physical sense, the particles themselves. According to one embodiment of the invention, the encapsulating medium is a thermally removable organic material, and the mechanism of removal is primarily thermal or heat-activated, meaning that upon application of heat to the encapsulated particles by contact with a fluid at elevated temperature, the organic coating is removed by any of several mechanisms including melting, vaporization, volatilization with entrainment of organic droplets in a hot fluid stream, chemical reaction with the hot fluid, or any combination of these mechanisms. The term "thermally removable" is further intended to include removal by combustion, as where the particle bed is swept with a free oxygen-containing gas stream maintained at oxidizing temperature to literally burn off the organic material from the smaller particles. According to another embodiment of the invention, the encapsulating medium is one which is soluble in a liquid solvent and the mechanism of removal is primarily one of physical dissolution of the encapsulant layer by contact with a suitable liquid solvent.

After the mixture of large particles and smaller encapsulated particles is loaded into the reactor, the encapsulant is removed in situ by treatment with an appropriate fluid. According to the thermal removal embodiment, the reactor is headed up and the bed is pretreated by contact with a suitable fluid maintained at elevated temperature for a time and temperature sufficient to remove substantially all of the plastic from the smaller particles. According to the solvent removal embodiment, a stream of liquid solvent capable of selectively dissolving the encapsulating medium is passed through the particle bed for a time and under conditions selected to remove substantially all of the encapsulating medium from the smaller particles. In either case, upon disintegration of the encapsulant layer, the smaller particles disperse themselves uniformly into the voids among the larger particles, and the reactor is then ready to be commissioned into the process for which it is designed.

This invention is applicable to a wide variety of catalysts depending on the specific reaction to be catalyzed. Typical processes which can involve mixed phase flow include hydrocracking, naphtha reforming and hydrosulfurization. However, since the benefits of the invention extend also to total vapor or gas phase operation, it is within the scope of the invention to utilize multiple sized catalyst fractions in processes such as hydrodealkylation, dehydrogenation, and fixed bed catalytic cracking. The catalysts herein utilized generally comprise a catalytically active metal composited with a refractory oxide support of either synthetic or natural origin. Suitable supports include alumina, silica, magnesia, zirconia, as well as binary composites such as alumina-silica, alumina-magnesia, alumina-zirconia and the like, as well as three and four component composites. The catalytically active metal may include platinum, nickel, molybdenum, chromium, cobalt or iron present either as the free metal or as an oxide thereof or as a complex with the refractory oxide support. In general, both the large size particles and the smaller particles will have catalytic properties; however, it is within the scope of this invention to utilize one group of particles having catalytic properties and another group of particles, either the larger size or the smaller particles, having non-catalytic properties. It is preferred that the small size particles be geometrically similar to the large particles, and still more preferably, both the large particles and the small particles are spherical. The instant technique may, however, be applied to particles having a shape other than spherical, such as cubical, cylindrical, extruded and irregular particles. In the case of spherical particles, the large particles, which are of uniform size, generally will have a diameter in the range of 1/8"–3/4". The smaller particles, which may or may not be of uniform size, will generally have a diameter in the range of 1/32"–1/2". It is preferred that the ratio of the diameters of the small particles to the large particles be of the order of 0.1 to 0.5. The proportion of small particles will of course vary with the specific application; generally, the small particles will constitute about 0.02%–0.5% by weight of the total catalyst bed.

(I) Use of thermally removable encapsulant

With regard to the use of a thermally removable organic material as the encapsulating medium, such medium broadly may comprise waxes, resins, gums, carbohydrates, cellulose ethers and esters and synthetic plastics including both thermosetting resins and thermoplastics. Thermoplastics are preferred because they are easy to apply and may be removed by application of heat alone without the need for thermal or oxidative decomposition. A preferred class of plastics are the hydrocarbon polymers such as polyethylene, polypropylene, styrene-butadiene copolymer, polyisobutylene rubber, and ethylene-propylene terpolymer rubber. Other suitable encapsulating media include polyvinyl alcohol, ethyl cellulose, cellulose acetate, cellulose acetate butyrate, nylon, chlorinated rubber, modified isomerized rubber, viny chloride, vinyl chloride acetate, vinylidene chloride, vinyl formal, vinyl butyral, polystyrene, acrylonitrile resin rubber, polymonochlorotrifluoroethylene, and polytetrafluoroethylene. The actual encapsulation of the small catalyst particles into the organic polymer may be done by means of rolling, molding, extruding or other mechanical means well known in the art.

A number of premixed particle batches, each including the encapsulated particles admixed with the large particles in the desired proportion, are separately prepared and are then successively poured into the reactor chamber. The reactor is then sealed and ready for the pretreating operation. The pretreating operation involves the application of heat to the particle bed. Such heating may be effected by conduction through the walls of the reactor but is more desirably carried out by flowing a preheated fluid medium into and/or through the fixed stationary bed of particles. Such fluid medium, which functions both as a heating medium and as a strippant, may include, for example, hydrogen, carbon monoxide, carbon dioxide, light hydrocarbon gases such as methane, ethane, propane, or butane, nitrogen, air, or a blend of oxygen with nitrogen. Where an oxygen-containing gas is employed, the encapsulant removal mechanism will involve primarily combustion of the plastic. The pretreatment temperature, or temperature to which the fluid strippant is brought prior to introducing the strippant into the reactor, is in the range of 300°–1400° F. and preferably of the order of 500°–1000° F. The time of pretreatment will depend upon the particular plastic and thickness thereof employed, as well as the pretreatment temperature, but typically will range from about 10 minutes to about 12 hours or more, and preferably from about 2 hours to about 4 hours. The pressure of the pretreating fluid may range from subatmospheric to 3000 p.s.i.g. or more, at a superficial linear gas velocity through the reactor of about 0.2–10 feet per second.

(II) Use of liquid-soluble encapsulant

The use of a liquid-soluble encapsulating medium is of particular advantage when a thermal treatment may lead to excessive coke deposition on the catalyst particles. The liquid-soluble encapsulating media may be either inorganic or organic and include, for example, waxes, gums, cellulose ethers and esters, alkyd resins, glyptol resins, chlornaphthalene resins, cyclohexanone resins, thiourea resins, oleoresins, vinyl resins, ketone resins, ketone-aldehyde resins, urea-aldehyde resins, phenol-aldehyde resins, water-soluble carbohydrates, natural gelatin, cellulose acetate, cellulose xanthate, cellulose nitrate, methyl cellulose, ethyl cellulose, acetyl cellulose, benzyl cellulose, polyvinylacetate, metallic soaps, alkylarylsulfonic acids and salts thereof, and quaternary ammonium compounds. Suitable inorganic encapsulating media include, for example, the nitrates, sulphates, halides, and carbonates of the alkali metals, alkaline earth metals, iron group metals, aluminum and the ammonium group. These inorganic salts may be composited with a clay binder and/or a water-soluble paste to make the encapsulant layer more cohesive and attrition-resistant. The liquid solvent utilized in this embodiment of the invention will be selected in accordance with its ability to dissolve the particular encapsulant employed, and may include, for example, aliphatic hydrocarbons such as hexane, heptane and octane; cycloparaffins such as cyclopentane, cyclohexane and methylcyclohexane; aromatic hydrocarbons such as benzene, toluene, xylene and tetrahydronaphthalene; halogenated hydrocarbons such as dichloromethane, dichloroethane, trichloroethane, carbon tetrachloride, ethylchloride, ethylenedichloride, tetrachloroethane, trichloroethylene, monochlorobenzene, dichlorobenzene, trichlorobenzene, and ethylene chlorhydrin; alcohols such as methanol, ethanol, n-propyl alcohol, isopropyl alcohol, n-butyl alcohol, benzyl alcohol, cyclohexanol, and alpha-terpineol; acids such as formic acid and acetic acid; ketones such as acetone, methyl ethyl ketone, hexone; ethers such as ethyl ether, isopropyl ether, 1,4-dioxan; esters such as methyl formate, ethyl formate, butyl formate, amyl formate, methyl acetate, ethyl acetate, n-propyl acetate, isopropyl acetate, n-butyl acetate and amyl acetate; nitroparaffins such as nitromethane, nitroethane, 1-nitropropane, and 2-nitropropane. Obviously, where the encapsulating medium is water-soluble, such as in the case of water-soluble starches and sugars or natural gelatin or inorganic salts, water may be employed as the solvent either alone or in admixture with other liquid solvents.

Several preferred encapsulating media, together with preferred solvents therefor, are set forth in Table I below:

TABLE I

| Encapsulating Medium | Solvent |
| --- | --- |
| Water-soluble starches and sugars. | Water. |
| Natural Gelatin | Water, dilute HCl. |
| Paraffin Wax | Acetone, carbon tetrachloride, cyclochlorohexanes, ethyl ether, petroleum ether. |
| Cellulose Acetate | Acetone, benzyl alcohol, benzyl formate, butyl acetate, cyclohexanyl acetate, diacetone alcohol, dioxane, dipropyl ketone, ethyl benzoate, furfural, methyl acetate, methyl cyclohexanone, n-propyl acetate, nitroparaffins. |
| Cellulose Nitrate | Acetone, amyl acetate, sec-amyl acetate, amyl formate, amyl lactate, amyl proprionate, n-butyl acetate, benzyl formate, butyl formate, butyl lactate, diacetone alcohol, dichlorhydrin, diethylene glycol, dipropyl ketone, ethyl acetate, ethyl benzonate, ethyl butyrate, ethyl ether, ethyl lactate, furfural, glycol diacetate, isobutyl acetate, isopropyl acetate, methyl acetate, methyl amyl acetate, methyl amyl ketone, methy butyl ketone, methyl cyclohexanone, methyl cyclohexanyl acetate, methyl ethyl ketone, methyl isobutyl ketone, methyl isopropyl ketone, methyl propyl ketone, octyl acetate, n-propyl acetate, tetrahydrofurfural alcohol. |
| Polyvinyl Acetate | Acetone, dichlorethyl ether, dioxane, ethylene dichloride, ethyl alcohol, isopropyl acetate, isopropyl alcohol, methanol, methyl acetate, methyl amyl acetate, methyl amyl alcohol, methyl amyl ketone, methyl isobutyl ketone, trichloroethylene, triethylene glycol. |

The actual encapsulation of the smaller particles with the liquid-soluble encapsulating medium may be accomplished by means of rolling, pelleting, molding, extruding or other mechanical means well known in the art.

After the mixture of large particles and smaller encapsulated particles is placed in the reactor, the liquid-soluble encapsulating medium is removed by passing a stream of a liquid solvent through the particle bed for a time and under conditions sufficient to remove substantially all of the encapsulating medium from the smaller particles. The temperature of the liquid solvent may range from about ambient up to about the decomposition temperature or the critical temperature of the liquid solvent, whichever is lower, and under a pressure sufficient to maintain the solvent substantially in the liquid phase. In most cases, a contacting temperature of the order of 100°–350° F. is preferred. The time required to dissolve substantially all of the encapsulating medium will depend upon the particular encapsulating medium and thickness thereof, the solvent power of the particular solvent employed, the contacting temperature and space velocity, but generally will range from about 2 hours to about 100 hours or more. The superficial linear liquid velocity through the particle bed will generally be maintained in the range of about 0.01 to about 2.5 feet per second.

The practice of the invention is further illustrated by the following specific example:

It is required to load a downflow hydrocracking reactor with a fixed bed of spherical catalyst comprising nickel-molybdenum on a silica-alumina support. The dimensions of the finished bed are 9.5' in diameter x 68.3' in depth, or a volume of 4850 cubic feet. The bed is to consist of 218,000 lbs. of ¼" catalyst spheres and 85 lbs. of $\frac{1}{32}$" catalyst spheres. The $\frac{1}{32}$" spheres, constituting about 0.04% by weight of the total bed, are to be uniformly distributed throughout the volume of the bed in the void spaces among the ¼" spheres.

The $\frac{1}{32}$" spheres are encapsulated in polyethylene to a plastic thickness of $\frac{7}{64}$", bringing the outside diameter of each such encapsulated sphere to ¼". The encapsulated spheres are mechanically mixed with the original ¼" spheres, in a double cone mixer having a 200 cubic foot capacity, in the ratio of 5 uncoated spheres to 1 encapsulated sphere. The premixed spheres are delivered to the reactor site in sealed 55 gallon drums which are poured into the reactor through an upper catalyst loading nozzle. The volume of the composite bed, as loaded, is 5,820 cubic feet at a bed depth of 82 feet. The reactor is then headed up, the recycle gas system is alternately evacuated and nitrogen-purged several times, and hydrogen pressuring and circulation is commenced. Hydrogen of 95% purity is circulated through the reactor at the rate of 170 mm. s.c.f.d. under a pressure of 1600 p.s.i.g. The reactor inlet temperature is increased at the rate of 100° F./hr., utilizing a fired charged heater, until the inlet temperature reaches 500° F. where it is held constant. Hot hydrogen flow is maintained for about 8 hours, during which period the polyethylene is melted and swept from the catalyst bed into the product recovery system. The product recovery system includes a water quench means and a gas-liquid separator. The volatilized polyethylene is quenched to form small beads or droplets suspended in an aqueous underflow which is drained from the separator to a sump. As the plastic is removed from the catalyst bed, the volume of the bed decreases, reaching a final depth of 68.3 feet when the removal of plastic is substantially complete. During the above pretreating operation, the catalyst bed depth may be monitored by a gamma ray solids level detection device, and the indicated level used to determine when pretreatment is completed to the desired degree. If desired, particularly when the shrinkage of the catalyst bed volume due to encapsulant removal is substantial, additional quantities of the mixture of large particles and encapsulated particles can be added to the reactor one or more times after the original loading and treatment. Following the pretreatment operation, the catalyst may be subjected to one or more chemical treatments in situ to adjust its activity level or for other purposes known in the art, before the outside feed is cut in and the unit is placed on stream.

Although the invention has been specifically described in the context of a catalyst loading technique, it will be appreciated by those skilled in the art that the invention can also be employed with respect to any fixed bed of solid contact material, in which it is desired to incorporate particles of different sizes including for example, solid adsorbents such as silica gel, activated charcoal, urea adducts, acid molecular sieves; clay treaters and packed fractionating columns.

I claim as my invention:

1. A method for loading a vessel with a fixed stationary bed of particles including a first portion of large particles of substantially uniform size and a second portion of smaller particles arranged such that the smaller particles are fairly uniformly dispersed throughout the volume of the bed, which comprises encapsulating said smaller particles with a removable solid encapsulating medium in sufficient amount so that the encapsulated particles have approximately the same exterior dimension as said large particles; thoroughly mixing the encapsulated particles with the large particles in the desired proportion; placing the resulting particle mixture in said vessel to provide a fixed stationary bed thereof; and contacting said bed with a fluid capable of selectively removing said encapsulating medium for a time and under conditions sufficient to remove substantially all of said medium from said smaller particles.

2. A method for loading a vessel with a fixed stationary bed of particles including a first portion of large particles of substantially uniform size and a second portion of smaller particles arranged such that the smaller particles are fairly uniformly dispersed throughout the volume of the bed, which comprises encapsulating said smaller particles with a thermally removable organic material in sufficient amount so that the encapsulated paritcles have approximately the same exterior dimension as said large particles; thoroughly mixing the encapsulated particles with the large particles in the desired proportion; placing the resulting particle mixture in said vessel to provide a fixed stationary bed thereof; and contacting said bed with a heated fluid for a time and at a temperature sufficient to remove substantially all of the organic material from said smaller particles.

3. A method for loading a vessel with a fixed stationary bed of particles including a first portion of large particles of substantially uniform size and shape and a second portion of smaller geometrically similar particles arranged such that the smaller particles are fairly uniformly dispersed throughout the volume of the bed, which comprises encapsulating said smaller particles with a thermally removable plastic in sufficient amount so that the encapsulated particles have approximately the same exterior dimension as said large particles; thoroughly mixing the encapsulated particles with the large particles in the desired proportion; placing the resulting particle mixture in said vessel to provide a fixed stationary bed thereof; and contacting said bed with a heated fluid for a time and at a temperature sufficient to remove substantially all of the plastic from said smaller particles.

4. The method of claim 3 further characterized in that said large and smaller particles are spherical.

5. A method for loading a vessel with a fixed stationary bed of particles including a first portion of large particles of substantially uniform size and a second portion of smaller particles arranged such that the smaller particles are fairly uniformly dispered throughout the volume of the bed, which comprises encapsulating said smaller particles with a thermally removable plastic comprising a hydrocarbon polymer in sufficient amount so that the encapsulated particles have approximately the same exterior dimension as said large particles; thoroughly mixing the encapsulated particles with the large particles in the desired proportion; placing the resulting particle mixture in said vessel to provide a fixed stationary bed thereof; and sweeping said bed with a heated gas stream for a time and a temperature sufficient to remove substantially all of the plastic from said smaller particles.

6. A method for loading a vessel with a fixed stationary bed of refractory spherical particles including a first portion of large spherical particles of substantially uniform size and a second portion of smaller spherical particles arranged such that the smaller particles are fairly uniformly dispersed throughout the volume of the bed, which comprises encapsulating said smaller particles with a thermally removable plastic comprising a hydrocarbon polymer in sufficient amount so that the encapsulated particles have approximately the same diameter as said large particles; thoroughly mixing the encapsulated particles with the large particles in the desired proportion; placing the resulting particle mixture in said vessel to provide a fixed stationary bed thereof; and sweeping said bed with a heated gas stream for a time and at a temperature sufficient to remove substantially all of the plastic from said smaller particles.

7. The method of claim 6 further characterized in that said large particles have a diameter in the range of about 1/8" to about 3/4".

8. The method of claim 6 further characterized in that said smaller particles have a diameter in the range of about 1/32" to about 1/2".

9. A method for loading a vessel with a fixed stationary bed of catalyst particles including a first portion of large catalyst particles of substantially uniform size and a second portion of smaller particles arranged such that the smaller particles are fairly uniformly dispersed throughout the volume of the bed, which comprises encapsulating said smaller particles with a thermally removable organic material in sufficient amount so that the encapsulated particles have approximately the same exterior dimension as said large particles; separately preparing a number of premixed particle batches each including said encapsulated particles thoroughly mixed with said large particles in the desired proportion; successively pouring said premixed batches into said vessel to provide a fixed stationary bed of particles; and sweeping said bed with a heated gas stream for a time and at a temperature sufficient to remove substantially all of the organic material from said smaller particles.

10. The method of claim 9 further characterized in that said large and smaller particles are spherical in shape.

11. The method of claim 10 further characterized in that said large particles have a diameter in the range of 1/8"–3/4".

12. The method of claim 10 further characterized in that said small particles have a diameter in the range of 1/32"–1/2".

13. A method for loading a vessel with a fixed stationary bed of particles including a first portion of large particles of substantially uniform size and a second portion of smaller particles arranged such that the smaller particles are fairly uniformly dispersed throughout the volume of the bed, which comprises encapsulating said smaller particles with a liquid-soluble solid encapsulating medium in sufficient amount so that the encapsulated particles have approximately the same exterior dimension as said large particles; thoroughly mixing the encapsulated particles with the large particles in the desired proportion; placing the resulting particle mixture in said vessel to provide a fixed stationary bed thereof; and contacting said bed with a liquid solvent capable of selectively dissolving said encapsulating medium for a time and under conditions sufficient to remove substantially all of said medium from said smaller particles.

14. A method for loading a vessel with a fixed stationary bed of particles including a first portion of large particles of substantially uniform size and shape and a second portion of smaller geometrically similar particles arranged such that the smaller particles are fairly uniformly dispersed throughout the volume of the bed, which comprises encapsulating said smaller particles with a liquid-soluble organic encapsulating medium in sufficient amount so that the encapsulated particles have approximately the same exterior dimension as said large particles; thoroughly mixing the encapsulated particles with the large particles in the desired proportion; placing the resulting particle mixture in said vessel to provide a fixed stationary bed thereof; and contacting said bed with a liquid solvent capable of selectively dissolving said encapsulating medium for a time and under conditions sufficient to remove substantially all of said medium from said smaller particles.

15. A method for loading a vessel with a fixed stationary bed of spherical particles including a first portion of large spherical particles of substantially uniform size and a second portion of smaller spherical particles arranged such that the smaller particles are fairly uniformly dispersed throughout the volume of the bed, which comprises encapsulating said smaller particles with a liquid-soluble organic encapsulating medium in sufficient amount so that the encapsulated particles have approximately the same diameter as said large particles; thoroughly mixing the encapsulated particles with the large particles in the desired proportion; placing the resulting particle mixture in said vessel to provide a fixed stationary bed thereof; and sweeping said bed with a stream of liquid solvent capable of selectively dissolving said encapsulating medium for a time and under conditions sufficient to remove substantially all of said medium from smaller particles.

16. The method of claim 15 further characterized in that said large particles have a diameter in the range of about 1/8" to about 3/4".

17. The method of claim 15 further characterized in that said smaller particles have a diameter in the range of about 1/32" to about 1/2".

18. A method for loading a vessel with a fixed stationary bed of catalyst particles including a first portion of large particles of substantially uniform size and a second portion of smaller particles arranged such that the smaller particles are fairly uniformly dispersed throughout the volume of the bed, which comprises encapsulating said smaller particles with a liquid-soluble organic encapsulating medium in sufficient amount so that the encapsulated particles have approximately the same exterior dimensions as said large particles; separately preparing a number of premixed particle batches each including said encapsulated particles thoroughly mixed with said large particles in the desired proportion; successively pouring said premixed batches into said vessel to provide a fixed stationary bed of particles; and sweeping said bed with a stream of liquid solvent capable of selectively dissolving said encapsulating medium for a time and under conditions sufficient to remove substantially all of said medium from said smaller particles.

19. The method of claim 18 further characterized in that said encapsulating medium is a water-soluble carbohydrate and said solvent comprises water.

20. The method of claim 18 further characterized in that said encapsulating medium is a wax and said solvent is selected from the group consisting of alkyl ketones, alkyl ethers and halogenated hydrocarbons.

No references cited.

GERALD M. FORLENZA, *Primary Examiner.*

A. J. MAKAY, *Assistant Examiner.*